Patented Jan. 19, 1937

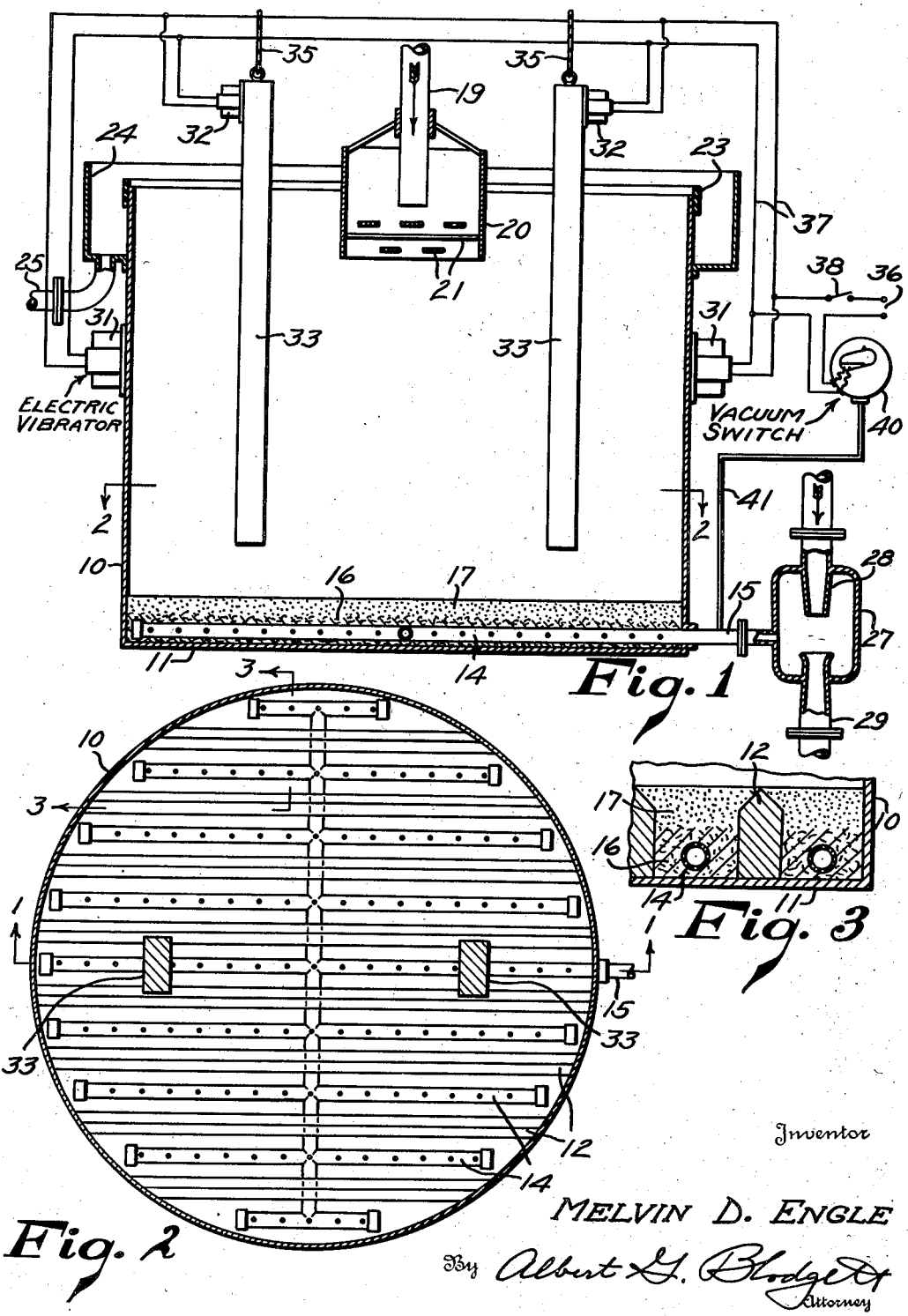

2,068,099

UNITED STATES PATENT OFFICE 2,068,099

SEPARATION OF LIQUIDS AND SOLIDS

Melvin D. Engle, Winchester, Mass.

Application May 15, 1935, Serial No. 21,614

13 Claims. (Cl. 210—124)

This invention relates to the separation of liquids and solids, and more particularly to an improved method and apparatus for filtering fine solid particles from a liquid in which they have been suspended.

It has been proposed heretofore to accelerate the action of a filter by subjecting the wet mixture to a differential pressure, as by providing a vacuum at the discharge of the filter. With certain mixtures this method fails to function in a satisfactory manner, as difficulty is experienced in maintaining a sufficient differential pressure, and an excessive amount of time is required to effect the desired separation. One example of a mixture difficult to separate is the water and fly-ash mixture which is discharged from wet gas scrubbers installed in connection with pulverized fuel furnaces. Unless the water is effectively removed from the mixture, it is very difficult to handle and dispose of the fly-ash. Similar problems are encountered in other industries.

It is accordingly one object of the invention to provide a method and apparatus which will effectively separate solids and liquids inexpensively and with comparative rapidity.

It is a further object of the invention to improve the art of filtering under differential pressure and to make possible the maintenance of a desired differential pressure throughout the filtering process.

With these and other objects in view, as will be apparent to those skilled in the art, the invention resides in the combination of parts and the steps of the process set forth in the specification and covered by the claims appended hereto.

Referring to the drawing illustrating one embodiment of the invention, and in which like reference numerals indicate like parts, Fig. 1 is a vertical section through a filter apparatus, the section being taken on the line 1—1 of Fig. 2;

Fig. 2 is a section on the line 2—2 of Fig. 1, with the filter material removed; and Fig. 3 is an enlarged fragmentary section on the line 3—3 of Fig. 2, with the filter material in place.

The embodiment illustrated comprises a tank 10 of substantial depth, which is shown in the form of a hollow cylinder with its axis vertical. The top of the tank is preferably open to facilitate the introduction and removal of material, and means is provided in the lower portion of the tank to filter the material and remove liquid therefrom. For this purpose the tank is formed with a closed bottom wall 11 above which are mounted spaced parallel horizontal bars 12. Perforated pipes 14 are located between the bars 12, and these pipes are all connected to a common discharge pipe 15, as shown particularly in Fig. 2. The pipes 14 are covered by a suitable filter material, which may comprise a lower layer 16 of glass wool and an upper layer 17 of sand. The glass wool serves to prevent the sand from entering the perforations in the pipes 14.

The mixture of solids and liquids to be separated is introduced downwardly into the upper central portion of the tank 10 by means of a vertical delivery pipe 19. The lower end of the pipe 19 is surrounded by a hollow cylindrical baffle box 20 having a series of transverse baffles 21 therein to distribute the inflowing mixture. The upper margin of the tank is provided with a leveling belt 23 which may be adjusted vertically to bring its upper edge into a horizontal plane. The belt 23 is surrounded by an overflow trough 24 having a drain pipe 25.

With the construction as so far described, a mixture of liquids and solids can be delivered to the tank 10 through the pipe 19, and the solids will tend to settle by gravity to the bottom of the tank. When the liquid reaches the top of the tank it will overflow into the trough 24 and escape through the pipe 25. The velocity of the liquid in directions radial of the tank will gradually decrease as it approaches the outer margin of the tank, and during this outward flow the solids will gradually sink downwardly because of their greater specific gravity. Hence comparatively clear liquid will escape from the overflow pipe 25 until the tank has become nearly filled with solids. As soon as a test of the overflow liquid indicates the maximum permissible concentration has been reached, the supply to the inlet pipe 19 will be shut off. After the filling of the tank has been completed the filter discharge pipe 15 is opened to allow the discharge by gravity of liquid from the wet mass of solids in the tank. Any clear liquid in the upper portion of the tank may be removed by syphoning or other methods of decanting.

Certain fine solids, such as fly-ash, will retain a large quantity of liquid in the interstices between the particles, apparently by reason of a capillary action, and such liquid cannot be removed satisfactorily by mere gravity filtration. In order to accelerate the filtration and increase its effectiveness, a differential pressure is applied to the wet mass and the filter bed. This may be accomplished by applying a partial vacuum or suction to the discharge pipe 15 of the filter. For this purpose the pipe 15 is shown connected to an ejector device 27 of a well-known type having an inlet nozzle 28 and a delivery pipe 29 in alignment therewith. By supplying a suitable fluid, such as water, to the nozzle 28 under high pressure, a considerable suction can be produced in the interior of the ejector. It is found however that soon after the ejector is put in operation, and long before the liquid has been sufficiently removed from the wet mass of solids, the vacuum in the filter discharge pipe decreases considerably and the filtering process substantially ceases.

I have discovered that this difficulty results from the formation of minute vertical cracks extending through the mass of material and making it possible for air to flow downwardly therethrough. Below a certain moisture content the mass has an angle of repose of substantially ninety degrees under quiet conditions, and as the volume of the mass decreases by reason of withdrawal of liquid, the mass shrinks laterally and these cracks are formed. This phenomenon may be avoided by maintaining the wet solids in a compact mass. This may be accomplished by various means, but I prefer to subject the material to vibration, causing it to settle by the combined effect of gravity and the vibrating action. This forces the solid particles together and prevents the formation of vertical cracks or openings through which air might flow downwardly to the filter bed and destroy the vacuum. To produce the desired vibration, I have shown electric vibrators 31 of a well-known type mounted on the tank 10, and similar vibrators 32 mounted on vertical rods 33 suspended within the tank by means of cables 35. The vibrators 31 and 32 are supplied with electrical energy from a suitable source 36 by means of conductors 37. A manually operable switch 38 may be provided to control the vibrators.

In some cases it may be desirable to control the vibrators automatically in inverse relationship with variations in the differential pressure effective on the filter bed. For this purpose I have shown a vacuum switch 40 of the well-known mercury type connected in the circuit of the vibrators and subjected by means of a pipe 41 to the partial vacuum in the filter discharge pipe 15. A switch of this general type is disclosed in the United States patent to McCabe No. 1,734,016, issued October 29, 1929. This switch 40 is preferably adjusted to open at a comparatively low absolute pressure such as one inch mercury column, and to close at a slightly higher absolute pressure such as five inches mercury column. The vibrators will thus be operated only when they are required to compact the material and permit the maintenance of a high vacuum.

The operation of the invention will now be apparent from the above disclosure. The discharge pipe 29 of the ejector is closed, and water is introduced through the nozzle 28 to backwash the filter bed and leave a protecting body of water on top thereof. A mixture of solids and liquids is delivered to the tank 10 through the pipe 19, and after an interval the discharge pipe 29 is opened to allow drainage of liquid from the tank by gravity. Liquid is allowed to fill the tank and overflow therefrom, escaping through the pipe 25 so long as the clarity of the escaping liquid is within the permissible limit. When this limit is reached, the supply is shut off, and any clear liquid on the top of the wet mass of solids may be removed by syphoning or otherwise. Instead of the foregoing procedure, partially concentrated material may be supplied directly to the tank. Water or other fluid is now supplied under pressure to the nozzle 28 of the ejector 27, thus creating a high vacuum in the filter discharge pipe 15 and compelling the liquid present in the wet mass in the tank to escape downwardly through the filter bed. The switch 38 is closed, and the switch 40 will remain open so long as the desired vacuum is maintained. Upon a predetermined drop in the vacuum, the switch 40 will close, starting the vibrators 31 and 32. The vibrators 31 will vibrate the side walls of the tank 10, and the vibrators 32 will vibrate the vertical rods 33. The vibrating walls and rods will produce a powerful vibration in the wet material, forcing the material to settle into a compact mass through which no air can travel downwardly to destroy the vacuum. The desired vacuum will thus be restored, whereupon the switch 40 will open and the vibration will cease. This operation will be continued as long as may be necessary to obtain the degree of liquid separation desired, whereupon the switch 38 will be opened and the supply of fluid to the ejector 27 will be shut off. The solid material may then be removed from the tank by any suitable means, such as a clam-shell bucket. The bars 12 serve to protect the perforated pipes 14 from damage, and prevent the bucket or other removal means from disturbing the filter material 16, 17.

The process is simple, comparatively rapid, and effective for the purpose intended. It makes it economically feasible to remove water from fly-ash to the degree necessary for ready handling and disposal of such material. The apparatus required is comparatively simple and inexpensive.

Having thus described my invention, what I claim as new and desire to secure by Letters Patent is:

1. The method of separating solids from liquids mixed therewith comprising the steps of withdrawing sufficient liquid from the mixture to leave a wet mass having an angle of repose of substantially ninety degrees under quiet conditions, removing additional liquid from the bottom of the mass by applying a differential air pressure to the mass, and applying forces to the mass to compact the same and prevent the formation of vertical cracks therein through which air might travel downwardly.

2. The method of separating solids from liquids mixed therewith comprising the steps of withdrawing sufficient liquid from the mixture to leave a wet mass having an angle of repose of substantially ninety degrees under quiet conditions, removing additional liquid from the bottom of the mass by applying a partial vacuum thereto, and applying forces to the mass to compact the same and prevent the formation of vertical cracks therein through which air might travel downwardly.

3. The method of separating solids from liquids mixed therewith comprising the steps of withdrawing sufficient liquid from the mixture to leave a wet mass having an angle of repose of substantially ninety degrees under quiet conditions, removing additional liquid from the bottom of the mass by applying a differential air pressure to the mass, and vibrating the mass to prevent the formation of vertical cracks therein through which air might travel downwardly.

4. The method of separating solids from liquids mixed therewith comprising the steps of withdrawing sufficient liquid from the mixture to leave a wet mass having an angle of repose of substantially ninety degrees under quiet conditions, removing additional liquid from the bottom of the mass by applying a partial vacuum thereto, and vibrating the mass to prevent the formation of vertical cracks therein through which air might travel downwardly.

5. The method of separating solids from liquids mixed therewith comprising the steps of filtering the mixture, subjecting the mixture to a differential pressure to render the filtering more effective, applying forces to the mixture to compact the same and thereby facilitate the maintenance of the differential pressure, and controlling the application of said forces in inverse relationship with variations in the differential pressure.

6. The method of separating solids from liquids mixed therewith comprising the steps of filtering the mixture, subjecting the mixture to a differential pressure to render the filtering more effective, and applying forces to the mixture to compact the same whenever the differential pressure falls below a predetermined value.

7. The method of separating solids from liquids mixed therewith comprising the steps of filtering the mixture, subjecting the mixture to a differential pressure to render the filtering more effective, applying forces to the mixture to compact the same whenever the differential pressure falls below a predetermined minimum value, and stopping the application of said forces whenever the differential pressure exceeds a predetermined maximum value.

8. The method of separating solids from liquids mixed therewith comprising the steps of filtering the mixture, subjecting the mixture to a differential pressure to render the filtering more effective, vibrating the mixture to compact the same and thereby facilitate the maintenance of the differential pressure, and controlling the vibration in inverse relationship with variations in the differential pressure.

9. The method of separating solids from liquids mixed therewith comprising the steps of filtering the mixture, subjecting the mixture to a differential pressure to render the filtering more effective, and vibrating the mixture to compact the same whenever the differential pressure falls below a predetermined value.

10. The method of separating solids from liquids mixed therewith comprising the steps of filtering the mixture, subjecting the mixture to a differential pressure to render the filtering more effective, vibrating the mixture to compact the same whenever the differential pressure falls below a predetermined minimum value, and stopping the vibration whenever the differential pressure exceeds a predetermined maximum value.

11. Apparatus for separating solids from liquids mixed therewith comprising a tank for the mixture having a filter at the bottom thereof, the tank being open at the top to permit the removal of the solid residues, means to provide a partial vacuum at the discharge of the filter, and means to vibrate the wet mass of solids in the tank to prevent the formation of vertical cracks therein.

12. Apparatus for separating solids from liquids mixed therewith comprising a tank having a filter at the bottom thereof, vibrating means for the tank, means to provide a partial vacuum at the discharge of the filter, and a device responsive to variations in the partial vacuum and arranged to control the vibrating means automatically in inverse relationship with such variations.

13. Apparatus for separating solids from liquids mixed therewith comprising a tank having a filter at the bottom thereof, electrically operated vibrating means for the tank, means to provide a partial vacuum at the discharge of the filter, an electric switch to control the vibrating means, and means to close the switch automatically when the partial vacuum falls below a predetermined minimum value and to open the switch automatically when the partial vacuum exceeds a predetermined maximum value.

MELVIN D. ENGLE.